(12) United States Patent
She et al.

(10) Patent No.: US 11,269,466 B2
(45) Date of Patent: Mar. 8, 2022

(54) TOUCH PANELS

(71) Applicant: Beijing Zenithnano Technology Co., Ltd., Beijing (CN)

(72) Inventors: Youzhi She, Fujian Province (CN); Shudong Zhong, Beijing (CN)

(73) Assignee: Beijing Zenithnano Technology Co., Ltd., Beijing (CN)

( * ) Notice: Subject to any disclaimer, the term of this patent is extended or adjusted under 35 U.S.C. 154(b) by 0 days.

(21) Appl. No.: 17/230,695

(22) Filed: Apr. 14, 2021

(65) Prior Publication Data

US 2021/0333938 A1 Oct. 28, 2021

(51) Int. Cl.
*G06F 3/044* (2006.01)

(52) U.S. Cl.
CPC .. *G06F 3/0445* (2019.05); *G06F 2203/04102* (2013.01); *G06F 2203/04112* (2013.01)

(58) Field of Classification Search
CPC combination set(s) only.
See application file for complete search history.

(56) References Cited

U.S. PATENT DOCUMENTS

| | | | |
|---|---|---|---|
| 2010/0089623 A1 | 4/2010 | Jang et al. | |
| 2013/0265279 A1* | 10/2013 | Park | G06F 3/0445 345/174 |
| 2014/0078104 A1 | 3/2014 | Lee et al. | |
| 2021/0081065 A1* | 3/2021 | Hsiao | H05K 1/028 |

FOREIGN PATENT DOCUMENTS

| | | |
|---|---|---|
| CN | 201266244 | 7/2009 |
| CN | 101187057 | 2/2010 |
| CN | 101697288 | 4/2010 |
| CN | 102346588 | 2/2012 |
| CN | 103176679 | 6/2013 |
| CN | 103632755 | 3/2014 |
| CN | 104375728 | 2/2015 |
| CN | 104461135 | 3/2015 |
| CN | 104915048 | 9/2015 |
| CN | 105039911 | 11/2015 |
| CN | 105224115 | 1/2016 |

(Continued)

OTHER PUBLICATIONS

Chinese International Search Report, CN2020103494704, dated Feb. 26, 2021, 6 pages. No English Translation.

(Continued)

*Primary Examiner* — Deeprose Subedi
(74) *Attorney, Agent, or Firm* — Adsero IP

(57) ABSTRACT

The present disclosure discloses a touch panel, including an inductive electrode and a flexible circuit board, the inductive electrode including a first electrode axis and a second electrode axis intersecting each other, and the first electrode axis and the second electrode axis each including a plurality of touch electrodes and a plurality of signal electrodes; signal wires connected to the touch electrodes; and touch wires connected to the signal electrodes; the touch electrodes and the signal electrodes being arranged at intervals, and at least one touch electrode being arranged between two signal electrodes. With the technical solution, the present disclosure achieves a touch panel with a transparent and touch-enabled bezel.

20 Claims, 4 Drawing Sheets

(56) References Cited

FOREIGN PATENT DOCUMENTS

| | | |
|---|---|---|
| CN | 105867712 | 8/2016 |
| CN | 106484191 | 3/2017 |
| CN | 106756789 | 5/2017 |
| CN | 107254664 | 10/2017 |
| CN | 107783697 | 3/2018 |
| CN | 107881486 | 4/2018 |
| CN | 108074991 | 5/2018 |
| CN | 207458013 | 6/2018 |
| CN | 108766631 | 11/2018 |
| CN | 108878058 | 11/2018 |
| CN | 109686477 | 4/2019 |
| CN | 109782953 | 5/2019 |
| CN | 109871160 | 6/2019 |
| CN | 110058747 | 7/2019 |
| CN | 209071007 | 7/2019 |
| EP | 1691352 | 8/2006 |
| JP | 2015060728 | 3/2015 |
| JP | 2016004356 | 1/2016 |
| JP | 6350000 | 7/2018 |
| TW | M455209 | 6/2013 |
| WO | WO2016-190405 A1 | 12/2016 |
| WO | WO-2019-001068 A1 | 1/2019 |

OTHER PUBLICATIONS

Chinese International Search Report, CN2020103488972, dated Feb. 26, 2021, 5 pages. No English Translation.
Chinese International Search Report, CN2020103488506, dated Feb. 26, 2021, 6 pages. No English Translation.
Chinese International Search Report, CN2020103494545, dated Feb. 26, 2021, 6 pages. No English Translation.
Chinese International Search Report, CN2020103489119, dated Feb. 26, 2021, 5 pages. No English Translation.

\* cited by examiner

TOUCH PANELS

CROSS-REFERENCES TO RELATED APPLICATIONS

This application claims priority to Chinese Patent Application No. CN202010348911.9, entitled "TOUCH PANELS", filed on Apr. 28, 2020, the entireties of which are incorporated herein by reference in their entirety for all purposes.

TECHNICAL FIELD

The present disclosure relates to touch panels.

BACKGROUND

In recent years, touch panels have the characteristics of human-computer interaction, and have been widely used in electronic products such as smart phones, GPS navigator systems, tablet PCs, personal digital assistants (PDAs), and laptop PCs. The touch panels are configured to be used on display screens of these appliances to allow users to perform interactive input operations, thereby improving the efficiency of the input operations. Unfortunately, conventional touch panels are inadequate.

SUMMARY

In order to solve the above problem that a wire region of the touch panel is not touch-enabled, the present disclosure provides a touch panel, including an inductive electrode and a flexible circuit board, the inductive electrode including a first electrode axis and a second electrode axis intersecting each other, and the first electrode axis and the second electrode axis each including a plurality of touch electrodes and a plurality of signal electrodes; signal wires connected to the touch electrodes; and touch wires connected to the signal electrodes; the touch electrodes and the signal electrodes being arranged at intervals, and at least one touch electrode being arranged between two signal electrodes.

Preferably, the first electrode axis, the second electrode axis, the signal wires, and the touch wires are made of the same material, and a resistance is equal to or less than 20 $\Omega/\square$.

Preferably, the touch electrodes and the signal electrodes are arranged at intervals, and at least three touch electrodes are arranged between two signal electrodes.

Preferably, a maximum interval between two close touch wires is not greater than 5 mm.

Preferably, the flexible circuit board includes an electrode module and a wire module, the electrode module calculates data generated by touching the touch electrodes, and the wire module calculates data generated by touching the touch wires.

Preferably, the first electrode axis and the second electrode axis are vertically crossed.

Preferably, the first electrode axis and the second electrode axis are formed on the same plane substrate, and an insulating block is arranged between the first electrode axis and the second electrode axis.

Preferably, an insulating layer is arranged between the first electrode axis and the second electrode axis.

Preferably, the first electrode axis and the second electrode axis are arranged on different layers of a flexible substrate and bonded by a transparent optical adhesive.

With the technical solution, the present disclosure achieves a touch panel with a transparent and touch-enabled bezel.

DETAILED DESCRIPTION OF THE EMBODIMENTS

At present, ITO and other conductive materials are generally used to design a pattern for a display region in a touch device. Due to large impedance of the ITO material, materials such as conductive silver paste are generally used for electric transmission in a transmission region, so as to enter a chip to calculate a touch position. In the prior art, the conductive silver paste is generally thicker in order to reduce the impedance. As a result, the conductive silver paste is opaque, and then the conductive silver paste is covered by a shielding layer to form a bezel in the subsequent manufacturing process. In the prior art, the bezel of the touch device is opaque and has no touch function, resulting in a waste of space of the touch device. It is to be appreciated that solving the problem that the touch device has a bezel without a touch function is an urgent technical problem for those skilled in the art.

In order to make the objectives, technical solutions, and advantages of the present disclosure clearer, the present disclosure is further described in detail below in combination with embodiments. It is understood that the specific embodiments described herein are intended only to explain the present disclosure and are not to define the present disclosure.

Figure 1:
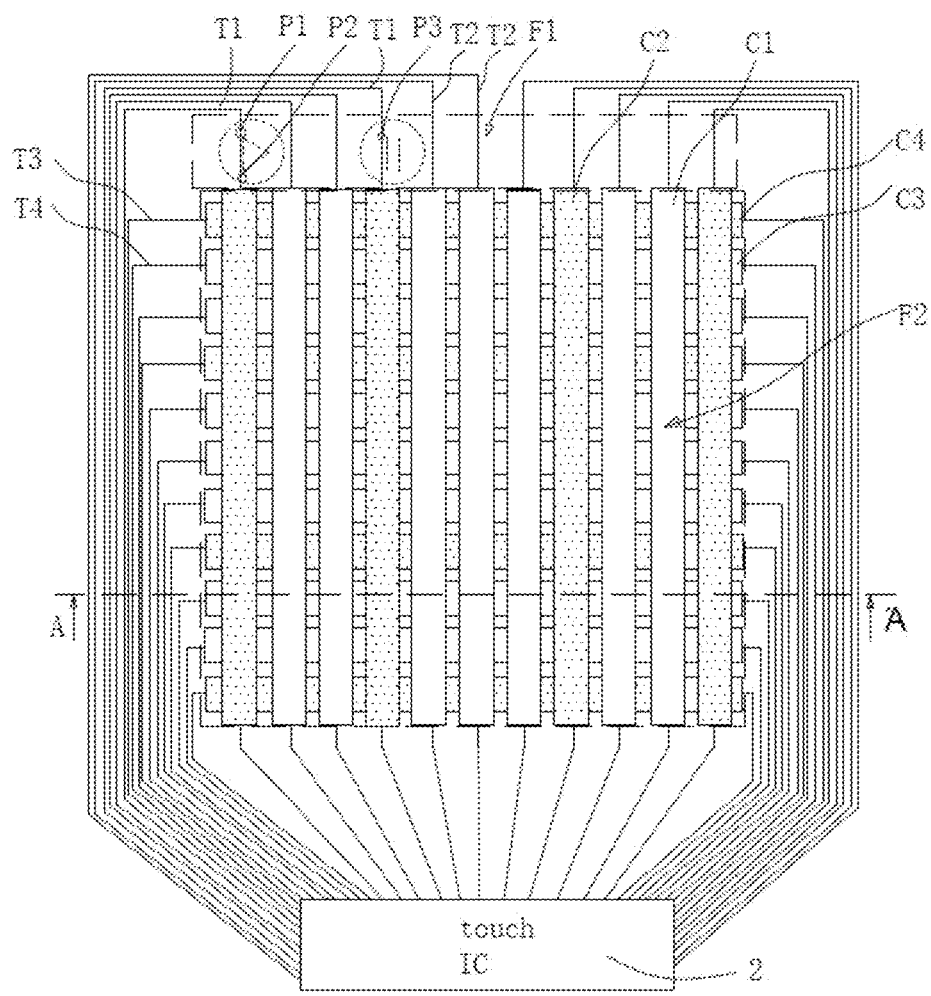
FIG. 1 is a schematic diagram of an embodiment of a touch panel according to the present disclosure.
Figure 2A:
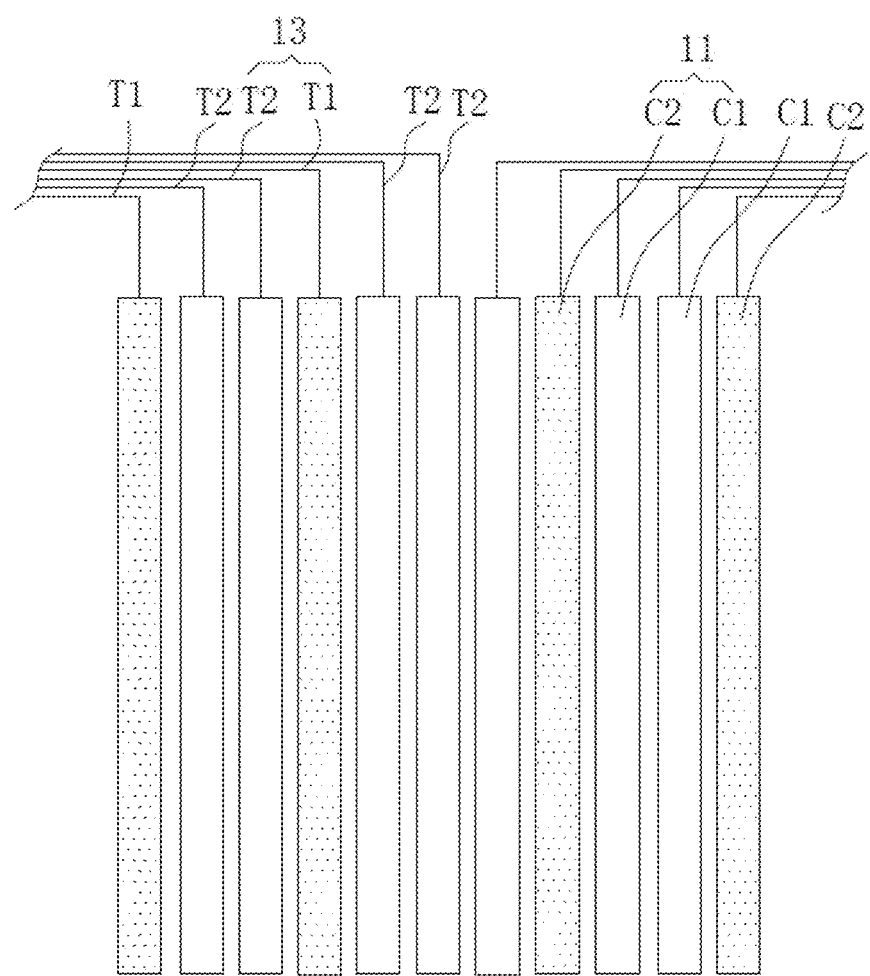
FIG. 2A is a schematic diagram of a first electrode axis layer in FIG. 1.
Figure 2B:
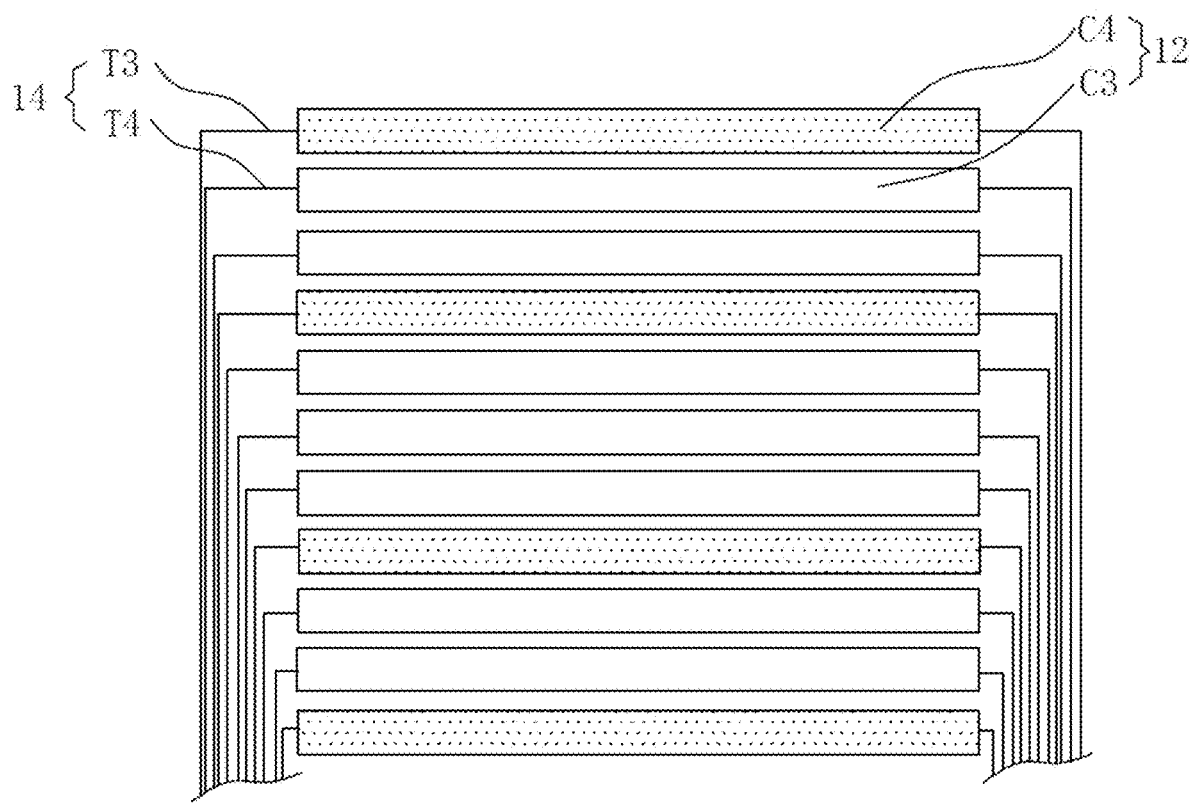
FIG. 2B is a schematic diagram of a second electrode axis layer in FIG. 1.

As shown in FIG. 1, FIG. 2A, and FIG. 2B, this embodiment provides a touch panel, including an inductive electrode and a flexible circuit board 2. The inductive electrode includes a first electrode axis 11 and a second electrode axis 12 intersecting each other. The first electrode axis 11 includes a plurality of touch electrodes C1 and a plurality of signal electrodes C2. The second electrode axis 12 includes a plurality of touch electrodes C3 and a plurality of signal electrodes C4. The inductive electrode further includes a first wire 13 and a second wire 14. The first wire 13 includes touch wires T1 connected to the signal electrodes C2 and signal wires T2 connected to the touch electrodes C1. The signal wires T2 do not intersect the touch wires T1. The second wire 14 includes touch wires T3 connected to the signal electrodes C4 and signal wires T4 connected to the touch electrodes C3. The signal wires T4 do not intersect the touch wires T3. The touch electrodes C1 and the signal electrodes C2 are arranged at intervals, and at least one touch electrode C1 is arranged between two signal electrodes C2. A region corresponding to overlap of the first electrode axis 11 and the second electrode axis 12 is an electrode region F2. A region corresponding to the wires form a wire region F1, for example, the region corresponding to the dashed box F1 in FIG. 1. In the prior art, in the wire region F1, the wires are made using opaque conductive silver paste. The wires are neither transparent nor have any touch function, so they can only be shaded by a shielding layer, which wastes the space of the touch panel. However, the first electrode axis 11 of the present disclosure includes a plurality of touch electrodes C1 and a plurality of signal electrodes C2. The touch electrodes C1 of the first electrode axis 11 and the touch electrodes C3 of the second electrode axis 12 overlap spatially. When a human body touches the electrode region F2 of the touch panel, a capacitance change is formed. A signal with a capacitance change is transmitted to the flexible circuit board 2 through the signal wires T2 connected thereto for calculation, to obtain a specific touch position in the electrode region F2 of the touch panel, which is a conventional technology and is not repeated. When a finger touches the wire region F1 of the touch panel, the flexible circuit board 2 enters a calculation mode different from that of the electrode region F2. The flexible circuit board 2 recognizes in advance that the wire region F1 is touched. When the finger touches a position P1 in FIG. 1, a cross electrode of the signal electrode C2 and the signal electrode C4 can form touch capacitance control of the wire region F1. Due to an action of a human electric field, a coupling capacitor is formed between the finger and a surface of the point P1 in the wire region, so the finger absorbs a very small current from the touch point P1. The flexible circuit board 2 may determine a transverse coordinate X1 of P1 through accurate calculation of a current of the signal electrode C4. By calculating a current of the signal electrode C2, the flexible circuit board 2 may determine a vertical position region of P1 in the wire region F1, but it cannot be accurate to a vertical position point. That is, when the flexible circuit board 2 detects that the wire region F1 is being touched, a vertical coordinate of the wire region F1 corresponding to the transverse coordinate X1 cannot be accurate to a coordinate value of a specific point. All vertical point values in the wire region F1 are the same, and the touch point P1 and a touch point P2 in the wire region F1 are indistinguishable. When the finger touches a point P3 of the wire region F1, the flexible circuit board 2 may calculate an abscissa value X3 different from the touch point P1, so as to distinguish P1 from P3. For example, a play key is set at P1/P2, and a pause key is set at P3. A play function may be turned on when the finger touches the point P1/P2. A pause function may be turned on when the finger touches the point P3.

The touch electrodes C1 and the signal electrodes C2 are arranged at intervals, and at least one touch electrode C1 is arranged between two signal electrodes C2, which may be understood as that the touch electrodes C1 and the signal electrodes C2 are arranged irregularly or regularly, and more than two touch electrodes are arranged between two signal electrodes C2. Preferably, the arrangement may be C2, C1, C1, C1, C2, C1, C1, C1, C2, C1, C1, C1, C1, C1, C1, C1, C2 . . . . In another embodiment, the arrangement is C2, C1, C1, C2, C1, C1, C1, C2, C2, C1, C1, C2, C1, C2, C2, C1, C1, C1, C1, C2 . . . . The second electrode axis has the same electrode arrangement.

Figure 6:
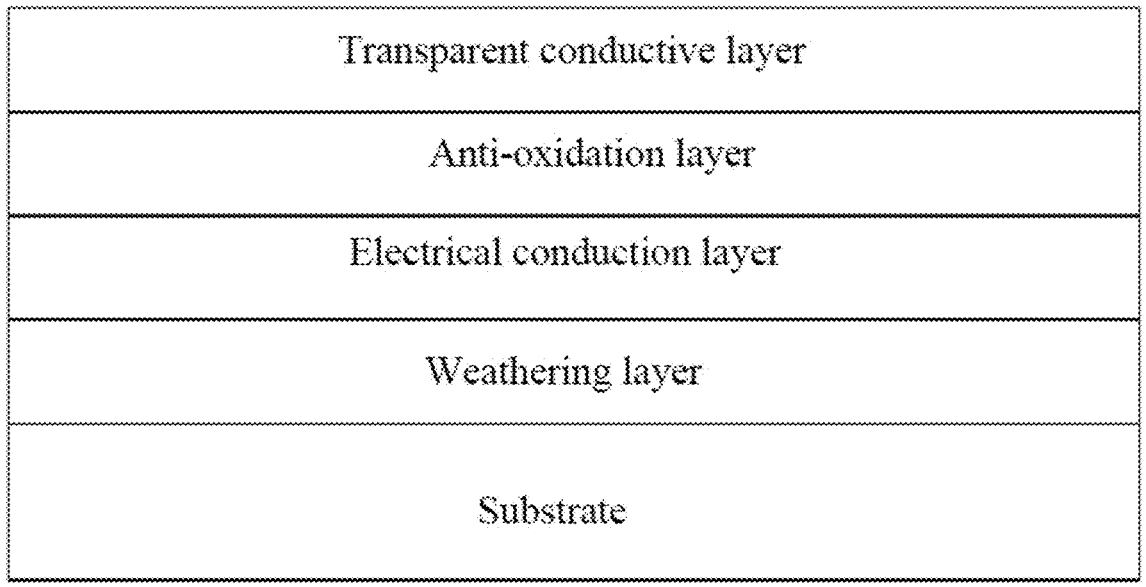
FIG. 6 is a schematic diagram of a laminated inductive electrode material.

In other embodiments, the first electrode axis 11, the second electrode axis 12, the signal wires T2, and the touch wires T1 are made of the same material, and a resistance is equal to or less than $20\Omega/\square$. The wire 13 is affected not only by the resistance but also by the reactance during signal transmission. When the resistance of a material of the inductive electrode is less than or equal to $20\Omega/\square$, the material of the inductive electrode may not only have touch sensing, but also be used for signal transmission in a case that the same material is used in the wire region F1 and the electrode region F2 (so as to keep the region F1 of the touch panel transparent). In other embodiments, as shown in FIG. 6, the material of the inductive electrode refers to a laminated composite material, including a weathering layer, an electrical conduction layer, an anti-oxidation layer, and a transparent conductive material layer. In this embodiment, the electrical conduction layer is less than or equal to 10 nm. When the electrical conduction layer is made of a composition of silver and silver oxide or a composition of a copper and copper nitride and the thickness of the electrical conduction layer is less than or equal to 10 nm, the electrical conduction layer can form a continuous layer to avoid forming an island structure, which can improve the conductivity without affecting the light transmittance of the conductive layer.

In other embodiments, the touch electrodes and the signal electrodes are arranged at intervals, and at least three touch electrodes are arranged between two signal electrodes. The number of the touch electrodes is greater than that of the signal electrodes provided that the signal wires satisfy data transmission of the touch wires, which is more conducive to improving the sensitivity of the touch.

In other embodiments, a maximum interval between two close touch wires T1 is not greater than 5 mm. It may be understood as that two touch wires T1 may be separated by a plurality of signal wires T2, and an indirect distance between the two close touch wires T1 separated by the greatest number of signal wires T2 is not greater than 5 mm. During the touch, a normal range of a finger touching the touch panel is like a circle with a diameter of 5 mm, and accuracy and sensitivity of a touch position are related to a capacitor formed by the touch wires. If a distance between touch sizes is too long, for example, a distance between two adjacent touch wires T1 is greater than 5 mm, the touch sensitivity may be reduced. Therefore, it is better that a finger width may cover more than two touch wires.

In this embodiment, the flexible circuit board includes an electrode module and a wire module, the electrode module calculates data generated by touching the touch electrodes, and the wire module calculates data generated by touching the touch wires. When the human body touches the region F2 of the touch panel, in the region, an induction signal of the touch electrode C1 of the first electrode axis 11 and a drive signal of the touch electrode C3 of the second electrode axis 12 are transmitted to the electrode module of the flexible circuit board through the signal wires T2 connected thereto for calculation.

In this embodiment, the first electrode axis 11 and the second electrode axis 12 are vertically crossed.

Figure 3:
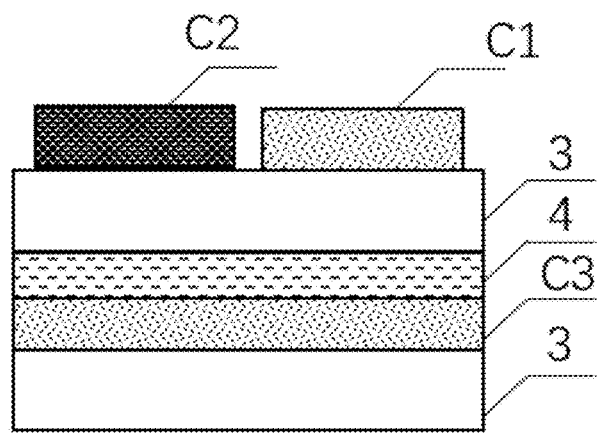
FIG. 3 is a schematic diagram of a profile in an A-A' direction of an embodiment of the touch panel.

In this embodiment, the first electrode axis 11 and the second electrode axis 12 are arranged on different layers of a flexible substrate and bonded by a transparent optical adhesive. As shown in FIG. 3, viewed from a profile of the touch panel of the present disclosure, the touch panel includes a substrate 3, touch electrodes C3 of the second electrode axis 12, an optical clear adhesive 4, a substrate 3, and the first electrode axis 11 (including touch electrodes C1 and signal electrodes C2) sequentially from bottom to top. The substrate 3 refers to a flexible transparent substrate, and is made of one or more materials selected from a group consisting of polyethylene terephthalate (PET), polyimide (PI), polypropylene (PP), polystyrene (PS), cellulose triacetate (TAC), FMH acrylonitrile-butadiene-styrene (ABS), polyvinyl chloride (PVC), polycarbonate (PC), polyethylene (PE), polymethyl methacrylate (PMMA), polytetrafluoroethylene (PTFE), a cyclic olefin copolymer (COP, Arton), and polyethylene naphthalate (PEN).

Figure 4:
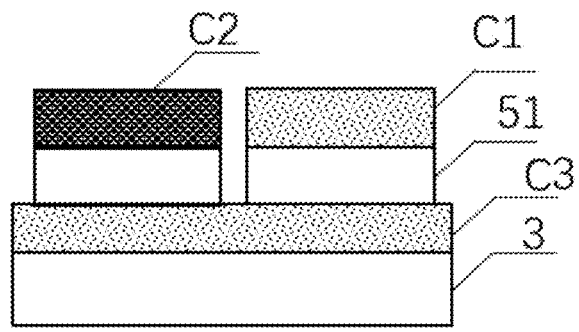
FIG. 4 is a schematic diagram of a profile in an A-A' direction of another embodiment of the touch panel.

In other embodiments, the first electrode axis 11 and the second electrode axis 12 are formed on the same plane substrate, and an insulating block is arranged between the first electrode axis and the second electrode axis. As shown in FIG. 4, viewed from a profile of the touch panel of the present disclosure, the touch panel includes a substrate 3, touch electrodes C3 of the second electrode axis 12, an insulating block 51, and the first electrode axis 11 (including touch electrodes C1 and signal electrodes C2) sequentially from bottom to top. The touch electrodes C1 may be made of ITO, nano-silver, or a metal electrode material such as Cu and Ag. A thickness of the touch electrodes C1 may be 50 nm to 2 um. The material and thickness of the signal electrodes C2 may be the same as those of the touch electrodes C1. The substrate 3 may be made of polyethylene terephthalate (PET), polyimide (PI), polypropylene (PP), polystyrene (PS), cellulose triacetate (TAC), FMH acrylonitrile-butadiene-styrene (ABS), polyvinyl chloride (PVC), polycarbonate (PC), polyethylene (PE), polymethyl methacrylate (PMMA), polytetrafluoroethylene (PTFE), a cyclic olefin copolymer (COP, Arton), polyethylene naphthalate (PEN), or the like. A thickness of the substrate 3 may be 23-188 um. The insulating block 51 may be made of an insulating materials such as polyethylene terephthalate (PET), polyimide (PI), polypropylene (PP), polystyrene (PS), cellulose triacetate (TAC), FMH acrylonitrile-butadiene-styrene (ABS), polyvinyl chloride (PVC), polycarbonate (PC), polyethylene (PE), polymethyl methacrylate (PMMA), polytetrafluoroethylene (PTFE), a cyclic olefin copolymer (COP, Arton), or polyethylene naphthalate (PEN) or an inorganic insulating material such as silicon dioxide or silicon nitride. A thickness of the insulating block 51 may be 1-188 um. In this embodiment, sheet resistance of the touch electrodes C1 is 15$\Omega/\square$, and sheet resistance of the signal electrodes C2 is also 15$\Omega/\square$. In this embodiment, optical transmission T of the touch panel is greater than 85%.

Figure 5:
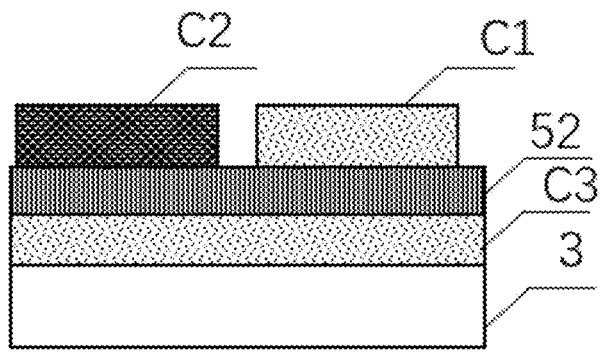
FIG. 5 is a schematic diagram of a profile in an A-A' direction of yet another embodiment of the touch panel.

In other embodiments, an insulating layer is arranged between the first electrode axis and the second electrode axis. As shown in FIG. 5, viewed from a profile of the touch panel of the present disclosure, the touch panel includes a substrate 3, touch electrodes C3 of the second electrode axis 12, an insulating layer 52, and the first electrode axis 11 (including touch electrodes C1 and signal electrodes C2) sequentially from bottom to top. A whole surface of the insulating layer in this embodiment is laid over the second electrode axis, and the insulating layer may be made of silicon dioxide, silicon nitride, polyimide, epoxy resin, or a combination of the above.

The invention claimed is:

1. A touch panel, comprising an inductive electrode and a flexible circuit board, the inductive electrode comprising a first electrode axis and a second electrode axis intersecting each other, and the first electrode axis and the second electrode axis each comprising a plurality of touch electrodes and a plurality of signal electrodes;
    signal wires connected to the touch electrodes; and
    touch wires connected to the signal electrodes;
    the touch electrodes and the signal electrodes being arranged at intervals, and at least one touch electrode being arranged between two signal electrodes;
    wherein the first electrode axis, the second electrode axis, the signal wires, and the touch wires are made of the same material having a resistance that is equal to or less than 20 $\Omega/\square$;
    wherein an optical transmission of the touch panel is greater than 85%.

2. The touch panel according to claim 1, wherein the touch electrodes and the signal electrodes are arranged at intervals, and at least three touch electrodes are arranged between two signal electrodes.

3. The touch panel according to claim 2, wherein a maximum interval between two close touch wires is not greater than 5 mm.

4. The touch panel according to claim 1, wherein the flexible circuit board comprises an electrode module and a wire module, the electrode module calculates data generated by touching the touch electrodes, and the wire module calculates data generated by touching the touch wires.

5. The touch panel according to claim 1, wherein the first electrode axis and the second electrode axis are vertically crossed.

6. The touch panel according to claim 1, wherein the first electrode axis and the second electrode axis are formed on the same plane substrate, and an insulating block is arranged between the first electrode axis and the second electrode axis.

7. The touch panel according to claim 1, wherein an insulating layer is arranged between the first electrode axis and the second electrode axis.

8. The touch panel according to claim 1, wherein the first electrode axis and the second electrode axis are arranged on different layers of a flexible substrate and bonded by a transparent optical adhesive.

9. The touch panel according to claim 1, wherein each of the plurality of touch electrodes is characterized by a first sheet resistance, each of the plurality of signal electrodes is characterized by a second sheet resistance, and the first sheet resistance and the second sheet resistance are substantially the same.

10. The touch panel according to claim 1, wherein each of the plurality of touch electrodes has a sheet resistance of 15 $\Omega/\square$.

11. The touch panel according to claim 1, wherein each of the plurality of signal electrodes has a sheet resistance of 15 $\Omega/\square$.

12. A touch panel, comprising a substrate, an inductive electrode, and a flexible circuit board, the inductive electrode comprising a first electrode axis and a second electrode axis intersecting each other, and the first electrode axis and the second electrode axis each comprising a plurality of touch electrodes and a plurality of signal electrodes;
    signal wires connected to the touch electrodes; and
    touch wires connected to the signal electrodes;
    the plurality of touch electrodes and the plurality of signal electrodes being arranged at intervals, and at least one touch electrode being arranged between two signal electrodes;
    wherein each of the plurality of touch electrodes is characterized by a first sheet resistance, each of the plurality of signal electrodes is characterized by a second sheet resistance, and the first sheet resistance and the second sheet resistance are substantially the same;
    wherein the touch panel has an optical transmission greater than 85%.

13. The touch panel according to claim 12, wherein the substrate comprises a material selected from the group consisting of polyethylene terephthalate (PET), polyimide (PI), polypropylene (PP), polystyrene (PS), cellulose triacetate (TAC), FMH acrylonitrile-butadiene-styrene (ABS), polyvinyl chloride (PVC), polycarbonate (PC), polyethylene (PE), polymethyl methacrylate (PMMA), polytetrafluoroethylene (PTFE), a cyclic olefin copolymer (COP, Arton), and polyethylene naphthalate (PEN).

14. The touch panel according to claim 12, wherein each of the plurality of touch electrodes comprises a material selected from the group consisting of ITO, nano-silver, Cu, and Ag.

15. The touch panel according to claim 12, wherein each of the plurality of signal electrodes comprises a material selected from the group consisting of ITO, nano-silver, Cu, and Ag.

16. The touch panel according to claim 12, wherein each of the plurality of touch electrodes is characterized by a first thickness and each of the plurality of signal electrodes is characterized by a second thickness, the first thickness and the second thickness are substantially the same.

17. The touch panel according to claim 12, wherein the first sheet resistance of each of the plurality of touch electrodes is 15 Ω/□.

18. The touch panel according to claim 12, wherein the second sheet resistance of each of the plurality of signal electrodes is 15 Ω/□.

19. The touch panel according to claim 12, wherein the substrate has a thickness of 23 μm to 188 μm.

20. The touch panel according to claim 12, wherein the inductive electrode comprises a material for both touch sensing and signal transmission.

* * * * *